United States Patent [19]

Robinson et al.

[11] 4,442,073
[45] Apr. 10, 1984

[54] SEPARATION AND RECOVERY OF METAL ALLOYS FROM SUPERALLOY SCRAP

[75] Inventors: Douglas J. Robinson; Aniedi O. Ette, both of Tucson, Ariz.

[73] Assignee: University Patents, Inc., Norwalk, Conn.

[21] Appl. No.: 380,859

[22] Filed: May 21, 1982

[51] Int. Cl.³ .................. C01G 37/14; C01G 53/00
[52] U.S. Cl. ........................... 423/54; 423/55; 423/58; 423/139; 423/140; 204/112; 75/119; 75/121
[58] Field of Search .............. 423/53, 55, 140, 58, 423/54, 139

[56] References Cited

U.S. PATENT DOCUMENTS

| | | | |
|---|---|---|---|
| 3,083,085 | 3/1963 | Lewis et al. | 23/312 |
| 3,458,277 | 7/1969 | Platzke | 23/22 |
| 3,544,309 | 12/1970 | Fletcher et al. | 75/108 |
| 3,607,236 | 2/1971 | Brooks | 75/10 R |
| 4,012,484 | 3/1977 | Lussiez | 423/53 |
| 4,138,249 | 2/1979 | Rosof | 75/103 |
| 4,193,968 | 3/1980 | Sullivan et al. | 423/112 |
| 4,211,753 | 7/1980 | Pemsler et al. | 423/54 |
| 4,318,788 | 3/1982 | Duffey | 423/53 |

OTHER PUBLICATIONS

A. O. Ette, Masters thesis, "Recovery of Molybdenum from Superalloy Scraps and Waste Products", 1980, pp. 22-24, 101.

Primary Examiner—Herbert T. Carter
Attorney, Agent, or Firm—John K. Williamson; James C. Valentine; John L. LaPierre

[57] ABSTRACT

A method for recovering superalloy scrap is disclosed. The method involves oxidizing superalloy scrap in an aqueous acidic medium. The aqueous acidic medium has an oxidation potential sufficient to oxidize nonferrous additive superalloy elements to insoluble oxides thereof and to oxidize major superalloy constituents to aqueously soluble species. The insoluble solids from the aqueous solution are separated when the aqueous solution is extracted with an aqueously substantially insoluble tertiary amine to form an organic phase and an aqueous phase. The aqueous phase contains essentially nickel and chromium values. The organic phase is sequentially extracted with aqueous solutions which selectively solubilize individual metal value species to form individual aqueous solutions having substantially single metal value species therein. The metal value species solutions are processed to obtain substantially pure metals.

7 Claims, 1 Drawing Figure

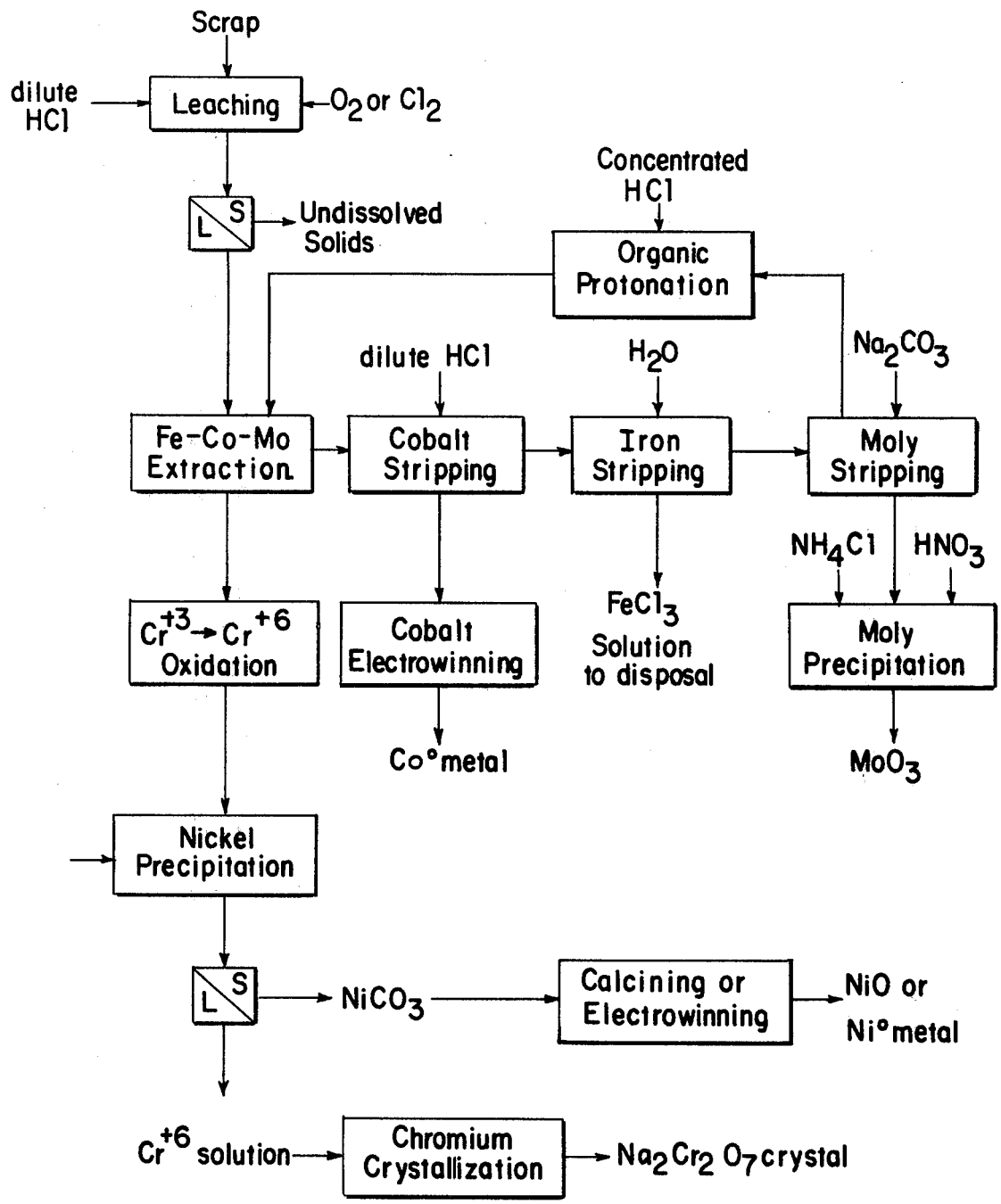

SEPARATION AND RECOVERY OF METAL ALLOYS FROM SUPERALLOY SCRAP

BACKGROUND OF THE INVENTION

This invention relates to the recovery of metal values from superalloy scrap and more particularly to the separation of metal values from superalloy scrap in substantially pure form.

DESCRIPTION OF THE PRIOR ART

In recent years "superalloys" have found increased utility and great increases in volume of production due to the need for articles having the special properties afforded by these materials. Among these properties are high temperature strength, high temperature oxidation resistance, corrosion resistance and the like. As the use of these superalloys grows, so does the amount of scrap and other waste containing them. The form of the scrap includes off-quality products, turnings, grindings, pouring skulls, mold gates, flashings and waste products such as sludges and the like.

Typically, superalloys are based upon chromium, nickel, cobalt, molybdenum, small amounts of iron, aluminum, silicon, titanium, columbium, tantalum and the like. The superalloys are predominantly composed of chrome and nickel as major constituents, and in most instances cobalt.

In many instances, the scrap superalloy as hereinbefore described is discarded in landfills and similar disposal methods because the individual metal values cannot be isolated for reuse. More particularly, it is desirable to recover and reuse the cobalt, chrome and nickel values so that they can be reused in producing superalloys. While it is recognized that turnings and grindings can be recycled for use in heats having the same alloy composition, a large portion of the scrap is generally downgraded and in many instances discarded. Further, the turnings and grindings, if they are to be used in heats of the same alloy composition, must be isolated and classified so that the alloymakers place these turnings and grindings in the appropriate heat.

Metallurgical methods have been used to treat superalloy scrap, but it has generally only been possible to produce a metal of iron, cobalt, nickel and possibly chrome and molybdenum while the refractory metals such as tantalum, titanium and columbium are lost in the slag. Although these metal values are recovered, they are in a form which is unsuitable for use in superalloy production.

The skilled artisans have attempted many methods to recover metal values from superalloy scrap with varying degrees of success. Exemplary of such efforts are those processes disclosed in U.S. Pat. Nos. 4,138,249; 4,193,968; 3,083,085 and 3,544,309.

In accordance with the present invention, a method of separating metal values from superalloy scrap is provided wherein the major constituents of the superalloy, such as nickel, chromium, cobalt and molybdenum, are separated from each other and recovered. Such recovery allows for isolation of these values in substantially pure form so that they can be reused in the manufacture of superalloys, thus conserving valuable raw materials.

BRIEF DESCRIPTION OF THE INVENTION

A method for recovering superalloy scrap is provided. The method involves oxidizing superalloy scrap in an aqueous acidic medium. The aqueous acidic medium has an oxidation potential sufficient to oxidize nonferrous additive superalloy elements to insoluble oxides thereof and to oxidize major superalloy constituents to aqueously soluble ionic species. The insoluble solids from the aqueous solution are separated and the aqueous solution is extracted with an aqueously substantially insoluble tertiary amine to form an organic phase and an aqueous phase. The aqueous phase contains essentially nickel and chromium values. The organic phase is sequentially extracted with aqueous solutions which selectively solubilize individual metal value species to form individual aqueous solutions having substantially single metal value species therein. The metal value species solutions are processed to obtain substantially pure metal values.

DETAILED DESCRIPTION OF THE INVENTION

"Superalloys" as used herein means and refers to alloy compositions containing nickel and/or chromium and cobalt and at least one metal selected from the group consisting of molybdenum, aluminum, titanium, tantalum and columbium.

"Valve metals" as used herein means and refers to refractory metals such as titanium, tantalum, columbium and the like which form oxide films stable enough to serve as capacitors or electronic valves.

The superalloy scrap useful in the practice of the invention is in the form of high surface area per unit weight material, such as grindings and other particulate matter. Preferably, the material has a mesh size of 20 to 200, and more preferably a mesh size of 100 to 200. The high surface area is desired so that it will readily react in the aqueous acid medium. Although very large pieces of superalloy scrap, i.e. on the order of one-eighth to one-half inch in diameter may be used, it is preferred that they be reduced in size in order to allow for ready reactivity with the acid solution.

Preferably, the scrap is first degreased by an appropriate organic solvent and/or otherwise treated to remove particulate impurities such as dirt and the like from the scrap prior to treatment in the process in accordance with the invention.

The scrap is then contacted with the aqueous acidic medium. The aqueous acidic medium useful in the practice of the invention is one which is rich in chloride ion so that it readily reacts with the metal values in the scrap. The chloride concentration in the aqueous acidic medium should be in the range of 150 to 350 grams per liter corresponding to 4.2 to 10 molar HCl. The aqueous acidic solution can be provided by hydrochloric acid per se or with chlorine gas to provide the desired acidity and chlorine concentration to the media.

Further, a hydrochloric acid solution can be enriched by the addition of chlorine gas thereto.

The solution potential is preferably controlled in the range of above $+500$ millivolts in order to provide a rapid leaching, i.e. reaction of the metal values with the acidic medium. Further, the solution potential should be at least about 750, and more preferably at least about 800 millivolts prior to solvent extraction in order to have any iron present as $Fe^{+3}$ and molybdenum as $Mo^{+6}$. Although these valence states for iron and molybdenum can be maintained at potentials less than 800 millivolts, it is desired to maintain the potential at or about 800 millivolts in order to ensure these valence states. In addition, the oxidation potential should be maintained at about 800 millivolts to ensure that the valve metals are converted from the metallic state to the oxide state. Typically, the valve metals in superalloys are aluminum, silicon, titanium, tantalum and columbium and, thus, are converted to aluminum oxide, silicon dioxide, titanium dioxide, tantalum oxide and columbium oxide. These valve metal oxides are believed to be insoluble in the aqueous acidic medium and are capable of being removed by filtration, and the aqueous acidic solution containing the metal values to be recovered can be further processed.

The solution potential is determined by placing a redox combination electrode in the solution and reading on the millivolt scale of a pH meter. The solution potential can be adjusted by addition of hydrogen gas or chlorine gas. If chlorine gas is bubbled into the solution, the oxidation potential will rise, while if hydrogen gas is bubbled in, the oxidation potential will decrease.

The initial reaction between the aqueous acidic medium and the superalloy scrap is conducted below about 105° C. at atmospheric pressure since it is limited by the boiling point of water and the ionic species present therein. However, higher temperatures may be utilized if the reaction is conducted under pressure. At a minimum, the initial reaction between the aqueous acidic medium and the superalloy scrap is about 80° C. Since the reaction is exothermic in nature, the reaction may be started at about 80° C. and the exotherm will cause a rise to near the boiling point, and will sustain the reaction at that temperature. It is recognized that these superalloys typically contain high amounts of cobalt and chromium and, in the case of most superalloys, a temperature of 70° to 80° C. is sufficient to provide reaction. However, due to the exothermic nature of the reaction, the solution typically rises to the 90° to 105° C. range.

The reaction between the aqueous acidic media and the superalloy scrap is allowed to proceed to apparent completion and the aqueous solution is filtered free of solids. The solids are the valve metal oxides and any other oxidized impurities that are present in particulate form. Typically, the resultant aqueous solution has 50 to 200 grams per liter of metal values in the form of iron, molybdenum, cobalt, chromium and nickel. The concentration of the various species is dependent, of course, upon the particular composition of the scrap. The soluble metal values are present in the form of $Fe^{+3}$, molybdenum as $Mo^{+6}$, cobalt as $Co^{+2}$, chrome as $Cr^{+3}$ and nickel as $Ni^{+2}$.

The aqueous solution is first extracted with an aqueously substantially insoluble tertiary amine. The tertiary amines useful in the practice of the invention are those typical insoluble amines having an average of 5 or greater carbon atom chains pendent from the amino group. Exemplary of such aqueously insoluble amines are triphenylamine, triisobutylamine, trihexylamine and triisooctylamine. A typical commercially available amine which is useful in the practice of the invention is Alamine 336 which is triisooctylamine sold by Henkel Corporation. The tertiary amine is dissolved in a hydrophobic solvent, and more preferably in a hydrocarbon solvent. The hydrocarbon solvent is preferably one which boils at above 100° C. so as to avoid loss of the solvent during processing. Typically, hydrocarbon solvents or monoalcohols having an average of 9 or greater carbon atoms are useful. The upper limit of the carbon atom chain length is determined by whether or not the solvent is liquid at processing temperatures. From an economic point of view, it is desirable to use a hydrocarbon such as kerosene or the like. It has been found that a mixture of isodecanol and kerosene is particularly useful as a solvent for extraction of the metal values from the aqueous solution. Preferably, the amine concentration is at a level of 5 to 25 percent by volume.

The aqueous acidic media containing the metal values of iron, molybdenum, cobalt, chrome and nickel is maintained at a temperature of about 30° to 50° C. and intimately contacted by the amine solution. The amine solution extracts cobalt, iron and molybdenum into the organic phase, thus providing an aqueous solution containing nickel and chromium with an organic phase containing cobalt, iron and molybdenum at the oxidation states previously recited.

If the extraction is done by countercurrent method, a rate of 0.5 to 2.0, and more preferably 1.0 to 1.25 of organic phase to one of aqueous phase is preferable. The organic phase containing the metal values is then intimately contacted with a cobalt chloride solution having 30 to 100 grams chloride per liter, and preferably 40 to 75 grams per liter. The organic phase is extracted by the cobalt chloride solution, preferably in countercurrent fashion, at a ratio of 5 to 10 of organic phase to one of the cobalt solution. It is necessary to control the chloride content of the cobalt chloride solution in order to achieve a selective separation of cobalt from the remaining metal values, particularly iron, in the organic phase. Subsequent to the stripping of the organic phase with the cobalt chloride solution, the cobalt chloride solution containing the extracted cobalt is separated and the cobalt recovered by electrowinning or by other methods well known to those skilled in the art.

The organic phase from which the cobalt has been extracted is then intimately contacted with water slightly acidified to remove the ferric ion. The total chloride content in the water must be 30 grams per liter or less, otherwise the iron will be retained in the organic phase. Because iron is a particularly plentiful metal and sources of iron other than from recovery are much less expensive, the solution containing the ferric iron can be discarded. The organic phase, which is free of cobalt and iron, is then adjusted with an appropriate base such as sodium carbonate, sodium hydroxide or the like to a pH of 10 or greater. Upon adjustment of the pH to 10 or greater, the molybdenum is stripped from the organic and can then be recovered by methods known to those skilled in the art.

The aqueous solution which contains the chromium and nickel values can then be treated by deacidifying the solution with an appropriate base, such as sodium carbonate, to a pH above about 7. The precipitate is formed, which is theorized to be nickel carbonate in the case of sodium carbonate addition and chromium hydroxide. Other precipitation methods known to those skilled in the art may be used; however, the method specified herein has the advantage that a substantially pure nickel-chromium precipitate is formed without the inclusion of other metal values. The precipitate can then be converted by methods known to those skilled in the art to a substantially pure nickel-chromium alloy. In the alternative, the nickel and chromium can be separated into separate metal values. The nickel and chromium precipitate can be treated with a peroxide, such as hydrogen peroxide or the like, to convert chromium +3 to chromium +6 and put the chromium into solution. The nickel precipitate can then be separated from the chromate-containing solution.

The process of the invention can be more fully understood by reference to the following drawing.

BRIEF DESCRIPTION OF THE DRAWING

FIG. 1 is a process flow sheet illustrating the process in accordance with the invention.

DETAILED DESCRIPTION OF THE DRAWING

In FIG. 1, the scrap is charged to an appropriate vessel containing the aqueous acidic medium having an oxidation potential of about 800 millivolts and a concentration of chloride at a level of 150 to 350 grams per liter. Upon dissolution of the chromium and nickel in the aqueous acidic medium, the undissolved solids are separated by filtration or the like and discarded. The aqueous acidic medium containing the metal values to be recovered is charged to an appropriate vessel and extracted with the organic amine solution to produce the organic phase having iron, cobalt and molybdenum, and the aqueous phase containing chromium and nickel. The cobalt is then extracted using cobalt chloride in aqueous solution, thus providing the cobalt in an aqueous solution which is separated from the organic solution. The cobalt is then electrowon to form cobalt metal. The organic solution is again stripped with water to form a solution of iron chloride, which is subsequently disposed of with iron in the aqueous phase, and molybdenum in the organic phase. The molybdenum in the organic phase is then stripped with sodium carbonate and treated with ammonium chloride and nitric acid to form molybdenum oxide. The remaining organic phase is treated with concentrated hydrochloric acid to protonate the tertiary amine, and thus can again be used in the iron-cobalt-molybdenum extraction previously discussed. The aqueous phase containing the chromium and nickel is then treated by oxidizing the chrome +3 to chrome +6, precipitating the nickel (as an insoluble nickel carbonate) and separating the solid phase which contains the nickel from the liquid phase which contains the chromium$^{+6}$. The solid nickel is then calcined or electrowon to form nickel oxide or nickel metal, respectively, and the chromium solution is treated in order to crystallize the chromium to form $Na_2Cr_2O_7$.

Thus, the process in accordance with the invention is applied in order to recover and separate the nickel and chromium which are present in scrap superalloy.

The following examples will more fully illustrate the process in accordance with the invention.

EXAMPLE I

Superalloy grindings having a composition of:
 56 percent Ni
 18 percent Cr
 13 percent Co
 5 percent Mo
 1 percent Fe
 Al, Ti, Ta and W
and having a particle size distribution of

| Mesh | +20 | −20 + 40 | −48 + 100 | −100 + 200 | −200 |
|---|---|---|---|---|---|
| Weight % | 2 | 20.6 | 49.30 | 20.50 | 7.60 | were used as a source of metal values.

To a 20 liter glass reactor fitted with a stirrer, thermometer and heating source was charged, at a nominal rate, 110 grams/hr of superalloy grinding and 16.6 ml/min of 29 percent HCl aqueous solution. The process was run for 21 hours at 85° to 105° C., thus treating 2090 grams of grindings with 19.9 liters of 29 percent HCl.

EXAMPLE II

Example I was repeated, except that the process was run for 19 hours and then for 3.4 hours at a grinding nominal feed rate of 110 grams/hr and 16 ml/min of 29 percent HCl aqueous solution. Finally, metal grindings were charged at a nominal feed rate of 220 grams/hr with an acid rate of 32 ml/min. The total grindings charged were 4050 grams, and the total acid charged was 14.5 liters. The run was conducted at 85° to 105° C.

EXAMPLE III

To the reactor of Example I was charged 300 grams of the metal grindings of Example I, along with 15 liters of 29 percent HCl. The reaction was run at 85° to 105° C. for 2 hours. After 2 hours, 1650 grams of grindings were charged at a nominal rate of 330 grams/hr along with 54 ml/min of 29 percent HCl for 4 hours. In Example III, 4650 grams of grindings were treated with 28 liters of 20 percent HCl.

EXAMPLE IV

Example III was repeated, except that after the initial 2 hour period grindings were charged at a nominal rate of 330 grams/hr, along with 54 ml/min of 29 percent HCl for 5.8 hours and, subsequently, 440 grams/hr of grindings along with 54 ml/min of 29 percent HCl for 8.1 hours.

In all of the examples there was an apparent dissolution of the metal grindings. However, there was about 5.6 percent of the initial grindings charged as a fine black metal powder.

EXAMPLE V

The acid solutions along with precipitated fractions were combined in a single vessel. The total solids were 19,400 grams with 151.7 liters of 29 percent HCl. The pH of the solution was well below zero. The reactor of Example I was charged with a portion of combined acid solution and the solution heated to 90° C. Grindings were fed into the reactor at a rate of 220 grams/hr and 29 percent HCl at a rate of 54 ml/min. The reaction was run for 5 hours.

In Examples I through V a total of 24,370 grams of metal grindings were utilized with only 930 grams remaining as undissolved metal.

Table I illustrates the material balance in grams for all of Examples I through V.

TABLE I

| | ELEMENT | | | | | | | | | | |
|---|---|---|---|---|---|---|---|---|---|---|---|
| | Ni | Cr | Co | Mo | Fe | Other | Cl | H | O | Total | Form/Compound |
| Input | | | | | | | | | | | |

TABLE I-continued

| | | | | ELEMENT | | | | | | | Form/ |
|---|---|---|---|---|---|---|---|---|---|---|---|
| | Ni | Cr | Co | Mo | Fe | Other | Cl | H | O | Total | Compound |
| Solid | 13647.2 | 4874.0 | 3168.1 | 1218.5 | 243.7 | 1218.5 | | | | 24370.0 | Grinding |
| All[1] | | | | | | | 43009.0 | 1211.5 | | 44220.5 | HCl |
| H$_2$O[1] | | | | | | | | 9124.9 | 72998.0 | 82123.8 | H$_2$O |
| Water[2] | | | | | | | | 4254.0 | 34032.2 | 38286.2 | H$_2$O |
| Total Input | 13647.2 | 4874.0 | 3168.1 | 1218.5 | 243.7 | 1218.5 | 43009.0 | 14590.4 | 107030.2 | 189000.5 | |
| Output | | | | | | | | | | | |
| Solution | 12635.0 | | | | | | 15204.8 | | | 27839.8 | NiCl$_2$ |
| | | 4693.0 | | | | | 9611.6 | | | 14304.6 | CrCl$_3$ |
| | | | 2931.3 | | | | 7055.0 | 99.4 | | 10085.7 | H$_2$CoCl$_4$ |
| | | | | 960.3 | | | 1775.5 | 20.0 | 160.0 | 2915.8 | H$_2$MoOCl$_5$ |
| | | | | | 231.0 | | 585.9 | 8.3 | | 825.2 | H$_2$FeCl$_4$ |
| | | | | | | | 7725.2 | 217.6 | | 7942.8 | HCl |
| | | | | | | | | 13358.9 | 106871.1 | 120230.0 | H$_2$O |
| Gas | | | | | | | | 886.2 | | 886.2 | H$_2$ |
| Crystals[3] | 485.9 | 0.02 | 113.7 | | 6.1 | | 1051.0 | | | 1656.7 | mixed crystals |
| Undissolved Solid | 526.3 | 94.1 | 123.1 | 134.3 | 6.6 | 46.5 | | | | 930.9 | Grindings |
| Fine Black Material[4] | | 86.88 | | 123.9 | | 1172 | | | | 1382.8 | Fine Black Material[4] |
| Total Output | 13647.2 | 4874.0 | 3168.1 | 1218.5 | 243.7 | 1218.5 | 43009.0 | 14590.4 | 107031.1 | 189000.5 | |

[1] Input is 35 percent HCl
[2] Water to make 29 percent HCl
[3] Mixed chloride crystals of Ni, Cr, and Fe
[4] Fine Black Material is valve metals and other impurities The final solution properties of the combined reaction products were as follows:
- 87.50 grams/liter Ni
- 32.50 grams/liter Cr
- 20.30 grams/liter Co
- 6.65 grams/liter Fe
- 294.60 grams/liter Cl
- 2.00 molar HCl
- Density: 1.280 grams/cm$^3$
- Potential: +177 mv It was noted during the running of Examples I through V that it was necessary to keep the chloride ion concentration at about 280 to 300 grams/liter for effective dissolution of grindings.

Although Examples I through V were conducted using HCl as an oxidant, other oxidants such as oxygen, ozone, chlorine, chromate ion or ferric ion can also be used in the practice of the invention.

The combined reaction products of Example I through V were raised to an oxidation potential of about +800 with H$_2$O$_2$ and were filtered free of solids and used as the base material for the remaining examples.

EXAMPLE VI

To a 5 gallon glass reactor equipped with an agitator and a thermometer was charged 1 gallon of combined reaction product along with 1 gallon of 30 percent by weight Alamine 336 (triisooctylamine), 40 percent by weight isodecanol and 30 percent by weight kerosene. The organic phase and the aqueous phase were heated to 40° C. and agitated to ensure intimate contact of the two phases for 4 minutes. The organic phase was drawn off and 1 gallon of amine solution was charged to the reactor and contacted and separated as previously described. Again, 1 gallon of amine solution was charged, contacted and separated as previously described. Thus, 1 gallon of reaction product had the cobalt, molybdenum and iron extracted therefrom into 3 batches of organic phase.

The 3 batches of organic phase were combined and extracted by 4 successive extractors with 1 gallon of aqueous HCl solution having a pH of 2. The aqueous phase contained the cobalt and the organic phase contained Fe and Mo.

The organic phase, which has the Co removed therefrom, was extracted by contacting with 1 gallon of water to remove Fe in the aqueous phase. The organic phase, which now contained only Mo, was adjusted to a pH of 10 to 12 by the addition of a 22 percent by weight aqueous solution of sodium carbonate, and the molybdenum was stripped from the organic phase as Na$_2$MoO$_4$. The organic phase was protonated by the addition of HCl and used for subsequent extractions.

The process of Example VI was repeated several times in order to treat 10.5 gallons of combined reaction product.

In the process of Example VI, 95 percent of Co, 98 percent of Mo, 99 percent of Ni and 94 percent of Cr were recovered from the combined reaction product.

EXAMPLE VII

The cobalt solution recovered in accordance with Example VI was filtered and neutralized to a pH of 5.5 with sodium carbonate to remove nickel and iron. The cobalt was recovered by electrowinning the cobalt solution.

EXAMPLE VIII

The molybdenum solution formed in Example VI as Na$_2$MoO$_4$ was converted to MoO$_3$ by reaction with ammonium chloride and then with nitric acid.

EXAMPLE IX

The aqueous solution containing Ni and Cr formed in Example VI was adjusted to a pH of 7 to 10 with sodium carbonate, thus precipitating NiCO$_3$ and Cr(OH)$_3$.

The precipitate was slurried in water and reacted with H$_2$O$_2$ to oxidize Cr$^{+3}$ to Cr$^{+6}$, thus providing soluble sodium chromate and precipitated NiCO$_3$. Once precipitated, the nickel can be electrowon. The chrome can be precipitated as CrO$_3$ or as Na$_2$Cr$_2$O$_7$.

Thus, precipitate can also be calcined to remove $CO_2$ and aluminothermically reduced to an alloy of Ni and Cr.

In order to provide maximum recovery of metal values from the superalloy scrap, certain parameters must be observed during the process.

Thus, prior to extraction with the organic phase, the reaction product must be carefully oxidized so that iron is present as $Fe^{+3}$, Mo is present as $Mo^{+6}$, cobalt is present as $Co^{+2}$ and chromium is present as $Cr^{+3}$. Further, to ensure the extraction of $Co^{+2}$, the $Cl^-$ content of the solution must be at about 250 grams/liter to ensure complete formation of the $CoCl_4^{-2}$ ion.

Although the specific examples herein are directed to a batch recovery process, the process of the invention is adaptable to performance of a continuous basis using known countercurrent methods.

Thus, the process of the invention provides a method of recovering a substantial amount of the valuable metal values in superalloy scrap.

Although the invention has been described with reference to specific processes and specific matrials, the invention is only to be limited so far as is set forth in the accompanying claims.

We claim:

1. A method of recovering metal values from superalloy scrap comprising the steps of:
   (i) oxidizing the superalloy scrap in an aqueous acidic media, said aqueous acidic media having an oxidation potential sufficient to oxidize valve metals to insoluble solid oxides thereof, and to oxidize non-valve metals to aqueously soluble ionic species wherein the chromium values are oxidized to the +3 valence;
   (ii) separating the insoluble solids from the aqueous solution;
   (iii) extracting the aqueous solution with an aqueously substantially insoluble tertiary amine to form an organic phase containing the non-valve metal values except for the nickel and chromium values and an aqueous phase containing nickel and chromium values; and
   (iv) separating the aqueous phase containing the nickel and chromium values from the organic phase wherein the improvement comprises the steps of:
   (v) oxidizing the chromium +3 to aqueous-soluble chromium +6;
   (vi) deacidifying the aqueous phase to a pH of about 7-10 with a soluble carbonate to form insoluble nickel carbonate;
   (vii) precipitating the nickel carbonate from the chromium-containing solution;
   (viii) recovering the nickel from the nickel carbonate precipitate; and
   (ix) recovering the chromium from the solution.

2. The method of claim 1 wherein the aqueous phase is deacidified to form insoluble nickel carbonate and chromium hydroxide before the chromium is oxidized to form aqueous-soluble chromium +6.

3. The method of claim 1 wherein step (v) comprises oxidizing the chromium with hydrogen peroxide.

4. The method of claim 1 wherein step (vi) comprises deacidifying with sodium carbonate.

5. The method of claim 1 wherein step (viii) comprises the recovery of nickel from the carbonate by calcining to form nickel oxide.

6. The method of claim 1 wherein step (ix) comprises recovering chromium as a chromate by crystallization.

7. The method of claim 1 wherein the aqueous acidic phase containing the chromium and nickel ionic species is a chloride solution and is deacidified with a soluble carbonate, and the nickel carbonate is formed in a chloride salt solution.

* * * * *